US007836146B2

(12) United States Patent
Sands, IV et al.

(10) Patent No.: US 7,836,146 B2
(45) Date of Patent: Nov. 16, 2010

(54) SYSTEM AND METHOD FOR CONCURRENTLY DOWNLOADING DIGITAL CONTENT AND RECORDING TO REMOVABLE MEDIA

(75) Inventors: Alexander P. Sands, IV, New York, NY (US); Marc D. Jordan, Los Angeles, CA (US)

(73) Assignee: Novarc L.L.C, New York, NY (US)

( * ) Notice: Subject to any disclaimer, the term of this patent is extended or adjusted under 35 U.S.C. 154(b) by 744 days.

(21) Appl. No.: 11/426,488

(22) Filed: Jun. 27, 2006

(65) Prior Publication Data

US 2006/0294376 A1 Dec. 28, 2006

Related U.S. Application Data

(60) Provisional application No. 60/694,332, filed on Jun. 27, 2005.

(51) Int. Cl.
*G06F 15/16* (2006.01)
(52) U.S. Cl. ...................................... 709/217
(58) Field of Classification Search ................ 709/217; 705/26; 725/91; 711/100, 167; 369/44.11, 369/44.31, 47.1, 47.11
See application file for complete search history.

(56) References Cited

U.S. PATENT DOCUMENTS

| | | | |
|---|---|---|---|
| 5,633,839 A | | 5/1997 | Alexander et al. |
| 5,917,782 A | * | 6/1999 | Kim et al. ................ 369/30.23 |
| 5,949,688 A | * | 9/1999 | Montoya et al. ............ 700/235 |
| 5,970,208 A | * | 10/1999 | Shim .......................... 386/126 |
| 6,248,946 B1 | | 6/2001 | Dwek |
| 6,308,007 B1 | * | 10/2001 | Iwasaki ...................... 386/116 |
| 6,381,575 B1 | | 4/2002 | Martin et al. |
| 6,397,189 B1 | | 5/2002 | Martin et al. |
| 6,552,975 B1 | * | 4/2003 | Tu et al. ..................... 369/47.1 |
| 6,587,404 B1 | | 7/2003 | Keller et al. |
| 6,651,113 B1 | * | 11/2003 | Grimsrud ..................... 710/22 |
| RE38,353 E | | 12/2003 | Peterson |
| 6,693,866 B1 | * | 2/2004 | Murata ..................... 369/53.34 |
| 6,728,729 B1 | | 4/2004 | Jawa et al. |
| 6,748,537 B2 | | 6/2004 | Hughes |
| 6,763,345 B1 | | 7/2004 | Hempleman et al. |
| 2001/0055253 A1 | | 12/2001 | Bresit |
| 2002/0111912 A1 | * | 8/2002 | Hunter et al. ................. 705/52 |
| 2002/0154691 A1 | * | 10/2002 | Kost et al. .............. 375/240.01 |
| 2002/0198944 A1 | | 12/2002 | Moss |

(Continued)

*Primary Examiner*—John Follansbee
*Assistant Examiner*—Imad Hussain
(74) *Attorney, Agent, or Firm*—Womble Carlyle Sandridge & Rice

(57) ABSTRACT

A method, system and program product to simultaneously download and burn digital media files via the Internet, including audio, video, video games and other digital content and data, onto removable storage media on personal computer burners. Large media files can be downloaded by pushing files or portions of files to computer memory and simultaneously downloading and burning files selected by a user. Once a file is burned to disc, it is then deleted from the computer's memory. A lossless compression scheme is used for audio files to decrease file size, making the downloading process faster and requiring less hard drive space. Content files other than audio are downloaded and burned through the same one-step process, without using a lossless compression scheme. An alternative method delays the start of the burn process to ensure that the downloaded files are written continuously to the removable storage media.

23 Claims, 7 Drawing Sheets

U.S. PATENT DOCUMENTS

| | | |
|---|---|---|
| 2003/0002862 A1* | 1/2003 | Rodriguez et al. .......... 386/125 |
| 2003/0004833 A1 | 1/2003 | Pollak et al. |
| 2003/0014436 A1 | 1/2003 | Spencer et al. |
| 2003/0014496 A1 | 1/2003 | Spencer et al. |
| 2003/0014630 A1 | 1/2003 | Spencer et al. |
| 2003/0033305 A1 | 2/2003 | O'Connor et al. |
| 2003/0040838 A1* | 2/2003 | Lagunzad et al. .......... 700/232 |
| 2003/0109944 A1 | 6/2003 | Ritz et al. |
| 2003/0144918 A1 | 7/2003 | Novelli et al. |
| 2003/0233563 A1* | 12/2003 | Kruse ........................ 713/193 |
| 2004/0143506 A1 | 7/2004 | Goldman |
| 2004/0199534 A1 | 10/2004 | Juszkiewicz |
| 2004/0199654 A1 | 10/2004 | Juszkiewicz |
| 2004/0205028 A1 | 10/2004 | Verosub et al. |
| 2004/0210538 A1 | 10/2004 | Forest |
| 2004/0220879 A1 | 11/2004 | Hughes |
| 2005/0010964 A1 | 1/2005 | Sano et al. |
| 2005/0025011 A1* | 2/2005 | Gabryjelski .............. 369/47.33 |
| 2005/0080877 A1* | 4/2005 | Sako et al. .................. 709/219 |
| 2005/0100312 A1* | 5/2005 | Commons et al. ............. 386/46 |
| 2005/0102191 A1* | 5/2005 | Heller ........................ 705/26 |
| 2005/0125524 A1 | 6/2005 | Chandrasekhar et al. |
| 2005/0289338 A1* | 12/2005 | Stadlman .................... 713/153 |
| 2006/0218604 A1* | 9/2006 | Riedl et al. ................... 725/91 |

* cited by examiner

SYSTEM AND METHOD FOR CONCURRENTLY DOWNLOADING DIGITAL CONTENT AND RECORDING TO REMOVABLE MEDIA

CROSS-REFERENCE TO RELATED APPLICATION

The present patent application is a formalization of a previously filed, provisional patent application entitled "Track At A Time Downloading and Burning Process," filed on Jun. 27, 2005 as U.S. patent application Ser. No. 60/694,332, by the inventors named in this patent application. This patent application claims the benefit of the filing date of the cited provisional patent application according to the statutes and rules governing provisional patent applications, particularly 35 USC §119 (e)(1) and 37 CFR §§1.78(a)(4) and (a)(5). The specification and drawings of the provisional patent application are specifically incorporated herein by reference.

FIELD OF THE INVENTION

The invention relates to digital media and, more specifically, to digital media distribution, including music, video, video games and other digital content.

BACKGROUND OF THE INVENTION

Digital downloading of media has become a widely accepted consumer practice and is now a viable way for businesses and individuals to distribute music, movies and other digital media and data files. However, personal computer storage limitations and significant downloading time have inhibited the downloading of large media files in their original format. In current practice, digital content, particularly audio, is often compressed in order to decrease files to manageable sizes, thus degrading the quality of the media. As a result, consumers purchasing digital files often must purchase an inferior product as compared to purchasing the product in its original form as a physical media product.

The invention's usefulness can currently be applied to the field of digital media distribution, including digital music distribution. Digital music practices are most often characterized by compressing original CD-quality audio files down to smaller file-sizes such as MP3 (MPEG layer 3). However, by compressing the audio, the files lose fidelity, and the ultimate result is an audio file with inferior sound quality when compared to the original audio product. Consumers are also restricted by digital rights management (DRM) algorithms embedded in most currently distributed digital music, which limit playback to certain portable hardware. Furthermore, in order to transfer audio to a portable disc (CD or DVD), users currently must partake in an additional and separate process of burning the compressed files to a portable disc.

The invention also has useful applications given the continuing technological advancements in high fidelity and high-resolution media. Advancements in audio and video technology have spurred the production and manufacturing of this high-quality media and hardware companion products. Most audio CDs are currently sold in 16-bit, 44.1 kHz format. However, the cited advances in audio are beginning to spur demand for 24-bit, 96 kHz audio, which is a higher quality audio product and almost twice as large in file size than 16-bit, 44.1 kHz audio. With CD and CD-player manufacturers increasing production of 24-bit products, the demand for 24-bit audio is expected to continue to grow. Advancements in video and other media rich and high-resolution content including, High-Definition (HD) and Secure Digital (SD) video, photos and Flash animation have also created sizable consumer markets and are growing rapidly. Further advances in media technology seem certain to continue at a considerable rate. These advances will increase the quality and resulting size of media available. The invention will assist in meeting this demand by enabling the effective digital delivery of larger, higher fidelity and higher resolution media products.

The increase in the number of households using broadband Internet connections and the increasing speed at which broadband is able to transmit data continues to make downloading a much quicker and more convenient experience for consumers. This has resulted in a greater number of individuals acquiring downloadable media over the Internet. Currently, cable and DSL modems generally provide 3-7 Mbps connections. Further advancements in cable and DSL as well as the development of fiber connections will make available connections capable of speeds ranging from 20-30 Mbps in the foreseeable future. This growth will intensify consumer demand for downloading media in general and increase the demand for larger, higher-quality digital downloads. An advantage of the invention is that it facilitates the distribution of these larger files to removable media more effectively and efficiently than what currently exists.

Blank CD and DVD sales also continue to rise dramatically as pre-recorded CD sales have declined, suggesting that individuals are burning more music and other media at home. Blank CDs have achieved sales levels which now surpass the sales levels of pre-recorded CDs. While demand for compiling audio and video products at home increases, the technology method of the present invention offers consumers an option to conveniently burn the highest quality digital products available directly to blank media discs in a one-step process. Also of note is the fact that DVD-R sizes are increasing dramatically, from the currently common 4.7 GB DVD-R to the newer double-layer 8.5 GB DVD+R. In the future, it is estimated that DVD sizes will grow up to 50 GB and possibly beyond.

It would be valuable to introduce an invention that enables consumers to conveniently obtain through digital means original and other high-quality media products in a one-step process.

SUMMARY OF THE INVENTION

The present invention provides the ability to push digital files from a remote server to a computer's memory and simultaneously burn the individual downloaded files to removable storage media such as CDs and DVDs in a one-step process. In the case of audio, the files that are pushed from the remote server are compressed with a lossless compression scheme. The method of simultaneous downloading, re-converting, burning and erasing the files from a computer's memory after they have been burned to disc allows users to avoid allocating significant amounts of hard drive space and enables users to download larger amounts of data in a shorter amount of time than may be possible otherwise.

In an exemplary embodiment, the method of the invention presently serves three primary functions: (1) to allow consumers to download and obtain CD-quality audio directly to recordable compact disc (CD-R) or rewritable compact disc (CD-RW) in a one-step process and reasonable amount of time without having to allocate large amounts of hard drive space, (2) to allow consumers to download video files directly to recordable digital video disc (DVD-R) or rewritable digital video disc (DVD-RW) in a one-step process and reasonable amount of time without having to allocate large amounts of hard drive space, and (3) to allow consumers to download other types of digital content directly to removable media discs, such as video games and 24-bit audio, in a one-step process and reasonable amount of time without having to allocate large amounts of hard drive space.

For music and video distribution, the process allows the delivery of original, high-fidelity CD-quality audio and original resolution video to users through a more convenient process. The inventive technology may be used to write any type of digital media delivered from a network directly to optical disc. These media types include, but are not limited to, DVD media, High-Definition DVD media, Surround Sound 5.1 audio, AIFF, MPEG, AAC, h.264, MPEG4, FLAC, OGG, WMA, Apple Lossless and SACD.

The inventive technology may be provided within a downloadable software interface that could also offer standard digital music storage and playback, management and format conversion capabilities. The inventive technology may also be embedded within the web pages of a website that can be operated after a background software download. The addition of other software features to the platform does not change the core architecture of the invention.

The invention enables users to obtain digital files in their original state and burn them directly to CD (CD-R or CD-RW) or DVD (DVD-R or DVD-RW). This result is achieved by downloading media files (lossless compressed files in the case of audio files) to a computer's memory. In the case of audio, the lossless compressed files are then individually re-converted to their original format, in many instances AIFF. The downloaded, re-converted files proceed through the simultaneous burning process directly on the downloading computer's media burner while the remaining files are being downloaded. Files are continually deleted from the downloading computer's memory individually as each file completes the process of burning to disc. This process allows users to conveniently compile original-quality media products digitally on blank CDs or DVDs in a one-step process. The process also enables consumers to download products in a reasonable amount of time and to use less storage space on the user's computer hard drive.

The invention is also useful in the distribution of video content. The invention allows for video files such as movies to be segmented into smaller pieces, which are then processed through the same simultaneous downloading, burning and erasing technique. The files are ultimately reassembled on DVD by referencing an original blueprint of the media file. The process allows users to acquire large video files without having to store the entire media file on their hard drives. Additionally, this one-step process allows consumers to burn media files such as movies directly to DVD for playback on home DVD entertainment systems instead of undertaking the additional and separate burning process or being limited to watching the content on a personal computer. Other digital content such as video games may be distributed in the same manner.

In one aspect of the invention, a method, system and program product are provided for downloading a plurality of digital files over a computer network and writing the digital files to a removable storage media. A list of digital files to download is compiled by a client device and transmitted over the network, using standard Internet transmission protocols, to a server having the digital files stored in a digital content database. Each digital file in the list is sequentially downloaded to memory on the client device. Each downloaded digital file is written from memory to the removable storage media while a next digital file in the list is concurrently being downloaded from the server. Each digital file is erased from memory immediately after being written to the removable storage media. The steps of sequential retrieval, concurrent writing and subsequent erasing of digital files is repeated until each digital file on the list has been written to the removable storage media.

The inventive process can achieve the same final disc results through a "heuristic" download and burn process which may be used to achieve seamless transitions between audio tracks or continuous downloading of audio or video content. During this heuristic method, a "disc-at-once" burning process is used rather than "track at a time." During this process, data proceeds through continuous downloading from the host network. An algorithm is used to determine at what point during the download the computer's media burner should begin the burning process. The algorithm is determined in part by estimating the download rate and the downloading computer's media burner's speed. As data is downloaded, the downloading computer's media burner begins to burn at the appropriate time during the download. The downloading and burning process proceeds continuously until all of the downloading data has been burned to disc. This heuristic method enables downloading and burning to conclude at approximately the same time while ensuring that the download is complete before the burn process concludes.

In another aspect of the invention, a method, system and program product are provided for downloading a plurality of digital files over a computer network and writing the digital files to a removable storage media. A list of digital files to download is compiled by a client device and is transmitted to a server having the digital files stored in a digital content database. Each digital file in the list is sequentially downloaded to memory on the client device. A heuristic algorithm determines when the downloaded digital files should begin a continuous writing to the removable storage media; Each downloaded digital file is written from memory to the removable storage media continuously and in sequential order while a next digital file in the list is concurrently being downloaded from the server. Each digital file is erased from memory immediately after being written to the removable storage media.

BRIEF DESCRIPTION OF THE DRAWINGS

These and other advantages and aspects of the present invention will become apparent and more readily appreciated from the following detailed description of the invention taken in conjunction with the accompanying drawings, as follows.

DETAILED DESCRIPTION OF THE INVENTION

Figure 1:
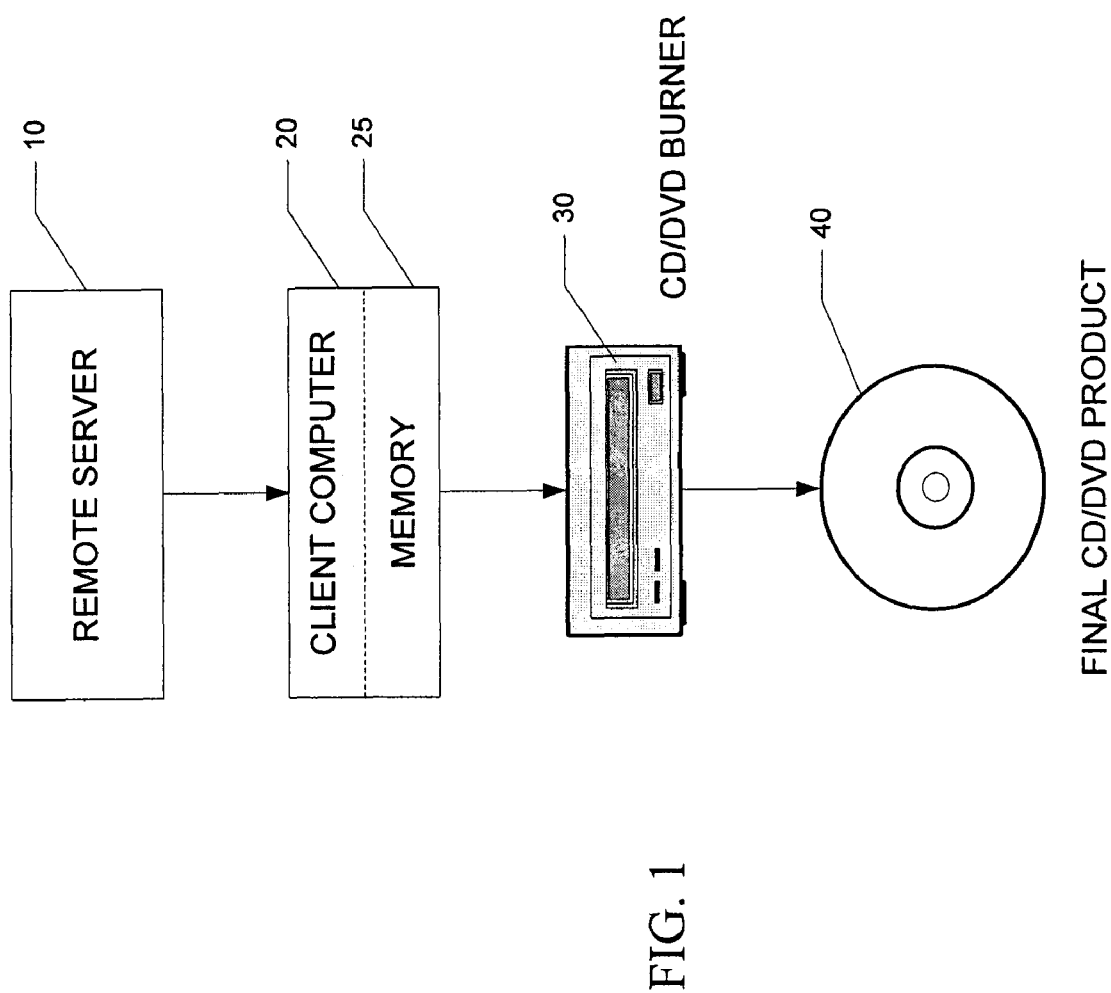
FIG. 1 illustrates the process flow in an exemplary embodiment of the present invention.

The following description of the invention is provided as an enabling teaching of the invention and its best, currently known embodiment. Those skilled in the art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations of the invention are possible and may even be desirable in certain circumstances and are part of the present invention. Thus, the following description is provided as illustrative of the principles of the invention and not in limitation thereof since the scope of the present invention is defined by the claims.

Certain technical terms are used in the following description and unless otherwise defined have their usual and customary meaning in the technical field. A CD (or DVD) burner is a CD (DVD) drive that is capable of writing data to a compact disc or digital video disc. The process itself is referred to as "burning" and produces CDs (DVDs) that area readable in other CD-ROM drives and audio CD (DVD) players. Virtual memory is a concept that can be implemented by a computer operating system to use a portion of the hard drive to swap out data when insufficient random access memory (RAM) exists to hold all of the data. When RAM is full, the computer swaps data to the hard drive and back as needed. Lossless compression refers to data compression techniques in which no data is lost. PKZIP is an example of a lossless compression technology.

The present invention allows a consumer to select one or more digital media files, download the files from a remote server and burn the files directly to CD-R or DVD-R on the consumer's personal computer's media disc burner. The process enables the timely and convenient digital distribution of large media files and provides the consumer with a physical copy of the media product in a one-step process. Uncompressed media files, such as Audio Interchange File Format (AIFF) audio files, are significantly larger in size than MP3 audio files, which are smaller, compressed and currently a standard file format for digitally distributed music. The large size of AIFF files has previously inhibited the digital delivery of these CD-quality files given personal computer storage limitations. Along with storage limitations, the significant amount of time that would be associated with the downloading of large media files using standard methods has also made this process impractical. However, the invention circumvents these obstacles by using a lossless compression scheme in the case of audio files and a process that simultaneously downloads a media file from a remote server while another downloaded file is burning directly to CD-R or DVD-R. The continuous process also ensures that files are deleted from the hard drive of users' computers once the files are burned to disc. In the case of audio files, this method allows consumers to obtain the exact same quality audio product over the Internet as they would if they were to purchase the audio product in traditional physical CD form via a retail store and with the same relative convenience as downloading it from an MP3-type downloading service such as iTunes. In the case of all media files, the invention allows users to obtain original quality content in the form of a physical CD or DVD product and allows users to obtain that product through a process that lessens the amount of hard drive storage space necessary to obtain the large-sized media content. This enables consumers to conveniently obtain uncompromised versions of media content.

In an exemplary embodiment, both the software (media player/burner/file distribution platform) and digital content (audio files, etc.) are available for download from a remote server. Consumers will be able to visit a website hosted on the remote server and download the media burner software to their computers. Links to the software can also be located on different websites (for instance an online music store or music artists' websites). Once the consumer has downloaded the software to his or her computer, the consumer will be able to access the library of individual digital files which are hosted on the remote server(s) and available for download. The present invention provides a novel process/method for delivery of digital media and the ability to record the media product on removable storage media (CD/DVD) in a one-step process.

As illustrated in FIG. 1, the technology includes two required components: a server 10 and a client 20. The server's responsibility is to serve up media files, compressed with a lossless compression scheme in the case of audio files, in an order specified by the client. The purpose of using a lossless compression scheme is to decrease download time while preserving the original quality of an audio file. In an exemplary embodiment, one lossless compression scheme that can be selected for the compression of audio files associated with the inventive process is Free Lossless Audio Codec (FLAC). The choice of FLAC as the compression standard is simply convenience. Other lossless compression formats such as Apple Lossless can be used without significantly changing the architecture of the software. The client requests a playlist to determine which files are to proceed through the download and burn process.

The method uses a simulated push rather than a real push from server 10 to client 20. A traditional server push would require the client computer 20 to be listening on an open port on the client side. When the server 10 wants to send a file, it simply opens a socket to that client port, and sends it. Since the client 20 would be listening, it immediately begins receiving the file. However, in the modern world of network security that is no longer a viable option for most situations because of firewalls and other security restrictions. Clients are unable to simply listen on sockets because they are unable to get through firewalls.

Instead of this traditional client-server model, the process simulates the push using a browser to web server protocol where the client has the responsibility to wait for a reply from each request.

This requires more work to be done on the client side, but for the purposes of the invention, it appears like a push from the server 10. Additional security is obtained because port 80 does not have to be used for sending files, which is traditional for the HTTP protocol used for serving web pages on the Internet. In most cases, a more or less random outgoing port can be used, which is much harder for someone to find on the Internet in order to corrupt. However, a fallback to port 80 is necessary since some corporate and personal firewalls block nearly everything but port 80. Testing for available ports can be done automatically by the client software.

Figure 2:
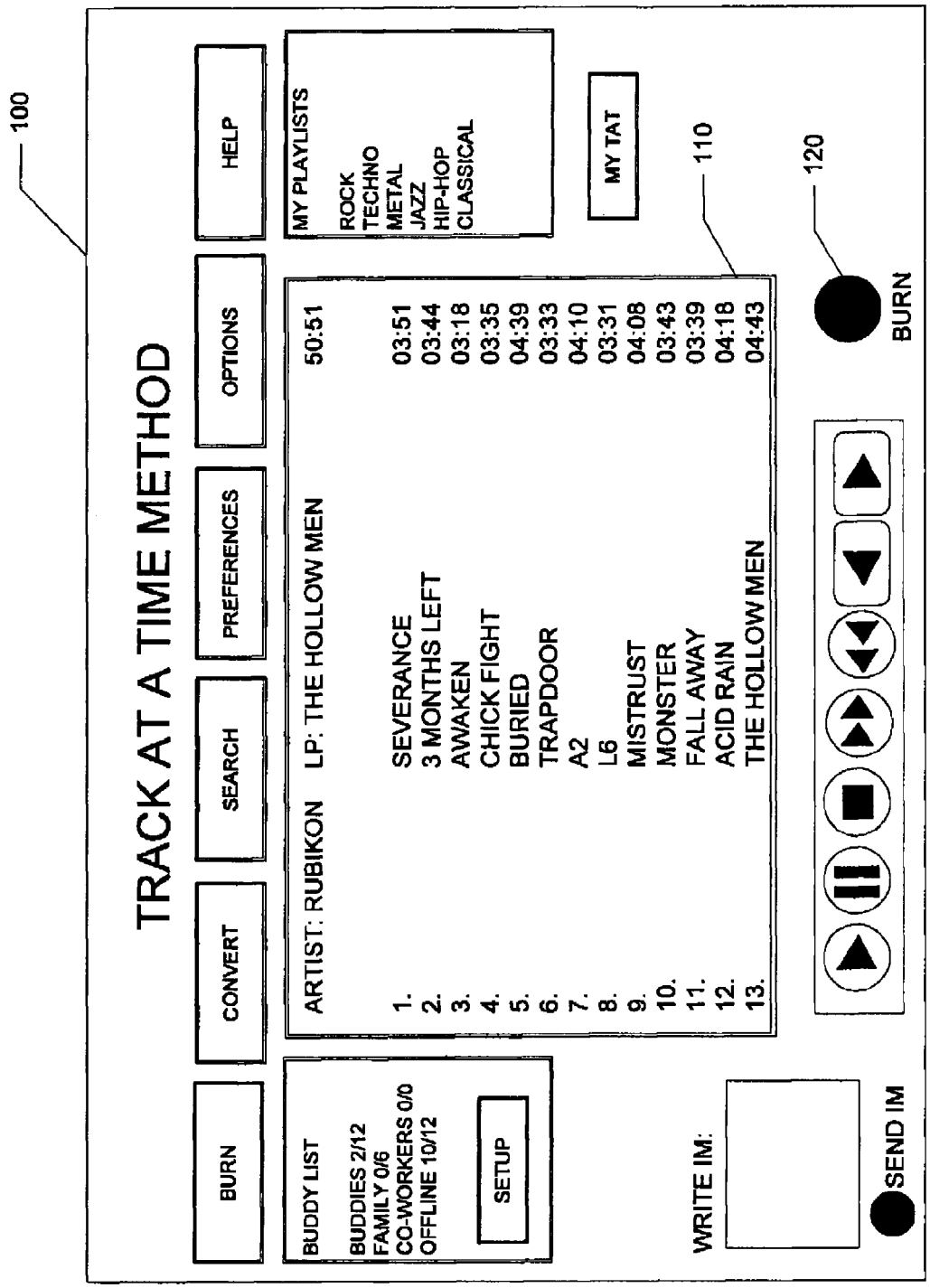
FIG. 2 illustrates an exemplary embodiment of the software interface of the present invention.
Figure 3:
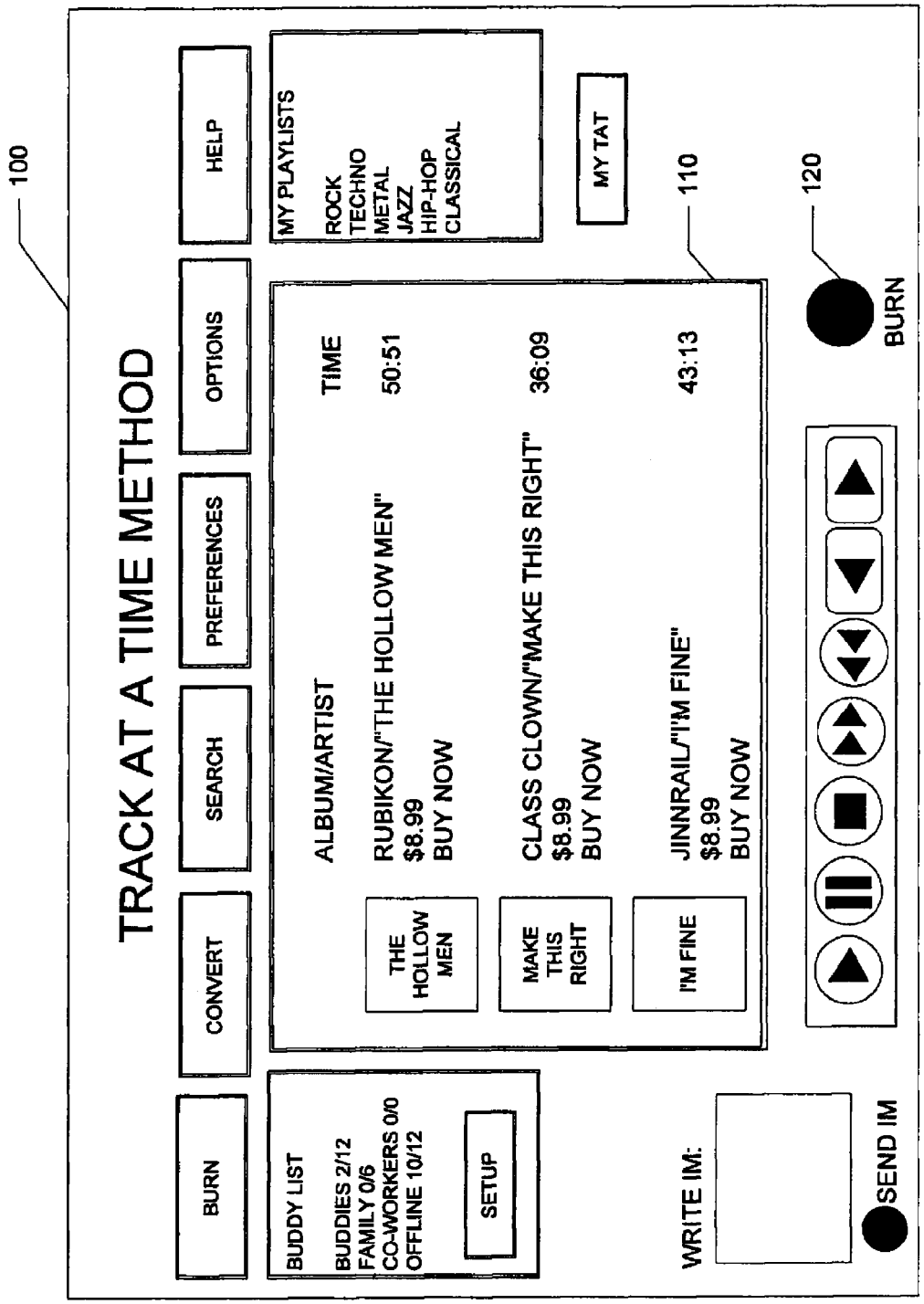
FIG. 3 illustrates a further exemplary embodiment of the software interface of the present invention.

Users are able to engage in this process by downloading an enabling software platform to their personal computer 20. Users are then able to select one or more files from a selection of files residing on a remote server 10 and appearing within the software interface 100, as illustrated in FIGS. 2-3. The file names subsequently appear in a new window 110 within the user's software interface, and the user is prompted to insert a recordable disc 40 into his/her personal computer's internal or external CD or DVD burner 30. Some individual files may be offered with anti-piracy tags, watermarks or other identifiers in order to protect certain content against unauthorized file-sharing or copying. These anti-piracy provisions would not have any effect on the inventive process.

The user initiates the file-burning process by clicking the "burn" or initiation button 120 on the software interface 100. The server 10 then initiates the transfer to the client computer 20. The files residing on the server 10, having been compressed with a lossless compression scheme in the case of audio files, are then pushed to the initiating user's computer memory 25. Memory may be virtualized on a user's computer allowing for downloads that are larger than the available physical free memory.

When the client is first run, a connection to the remote media server is made over port 80 sending a port number to test. This port number could be random or come from a list, depending on how the inventive process is set up to operate. For example, the port number could be fixed at something like 49200 (anything over 49152 is generally acceptable although other port ranges are also possible). When the media server receives the port number from the client it starts listening on that port for a request. The client then sends a test message to that port, and if it receives a response from the server, the client will use that port for the duration of the burn. If not, the client will fall back to using port 80.

The client software then sends a playlist to the server on the previously selected port. The server responds by sending each file in the playlist back to the client in the order selected for the burn. After each file is received by the client, the client sends a new request. The server responds by sending the next file in the list. This continues until all the tracks are delivered to the client. During this transmission process, files are encrypted using HTTPS (secure HTTP) protocol to prevent files from being detected and possibly intercepted. The HTTPS protocol is the traditional way to ensure that transactions meant for a particular client cannot be intercepted. This encryption will not permanently encrypt the files on CD or DVD, only during the transmission process. The inventive process may include an additional option to prevent unauthorized access and/or copying before the media is burned to disc. Once a file has been downloaded to the initiating customer's computer memory 25, that file begins to burn to CD (CD-R or CD-RW) or DVD (DVD±R or DVD±RW) 40 and the next file begins downloading from the remote server. The downloading of files from the server 10 can occur independently of the burn and multiple files may be downloaded into memory 25 before the burning of any individual file is complete. Alternatively, the burn process may be required to pause while waiting for the download of additional files. Once a file has been burned to CD or DVD 40, that file is erased from the computer's memory 25 freeing up additional computer memory space. This process repeats until all the files selected by the user have been burned to disc. This process of continually downloading, burning and erasing files allows users to obtain large media files in a timely manner. Also, by storing segments of content only temporarily, the process circumvents obstacles associated with personal computer storage limitations. The inventive process has useful applications for the distribution of any type of media or data file.

For digital audio file distribution, the client will decompress the lossless compressed file to the uncompressed Audio CD standard format while writing this format to CD-R. This format is a two channel 16-bit PCM (Pulse Code Modulation) encoded at a 44.1 KHz sampling rate.

The inventive process is also protected by password and will depend on receiving valid credit card authorization or some other authenticated payment. HTTPS protocol is used in order to ensure that these payments are secure.

For digital audio file distribution, the client component 20 is responsible for selecting a playlist, sending the playlist request to the server 10 and waiting for the server 10 to initiate a download of individual tracks and finally burning each individual track to a CD-R 40. When the process is initiated, the server 10 pushes the first file to the client computer's virtual memory 25, which is a memory management technique wherein computer memory is presented as contiguous memory even if a portion of that memory has been swapped from random access memory (RAM) to the computer's hard disk. As the data is either read or written, the computer operating system swaps the required data from the hard disk back to the computer's RAM making it available to the software. This effectively allows software to access more RAM than is physically available. After the initial file is downloaded, that file begins to burn to CD-R 40, and simultaneously, a second file begins to download to the client computer 20. Once the first track has burned to CD-R, it is erased from the computer's virtual memory 25. The second file can then be burned to the CD-R, and the third file begins to download. This process continues until all specified files are burned to CD-R.

Figure 4:
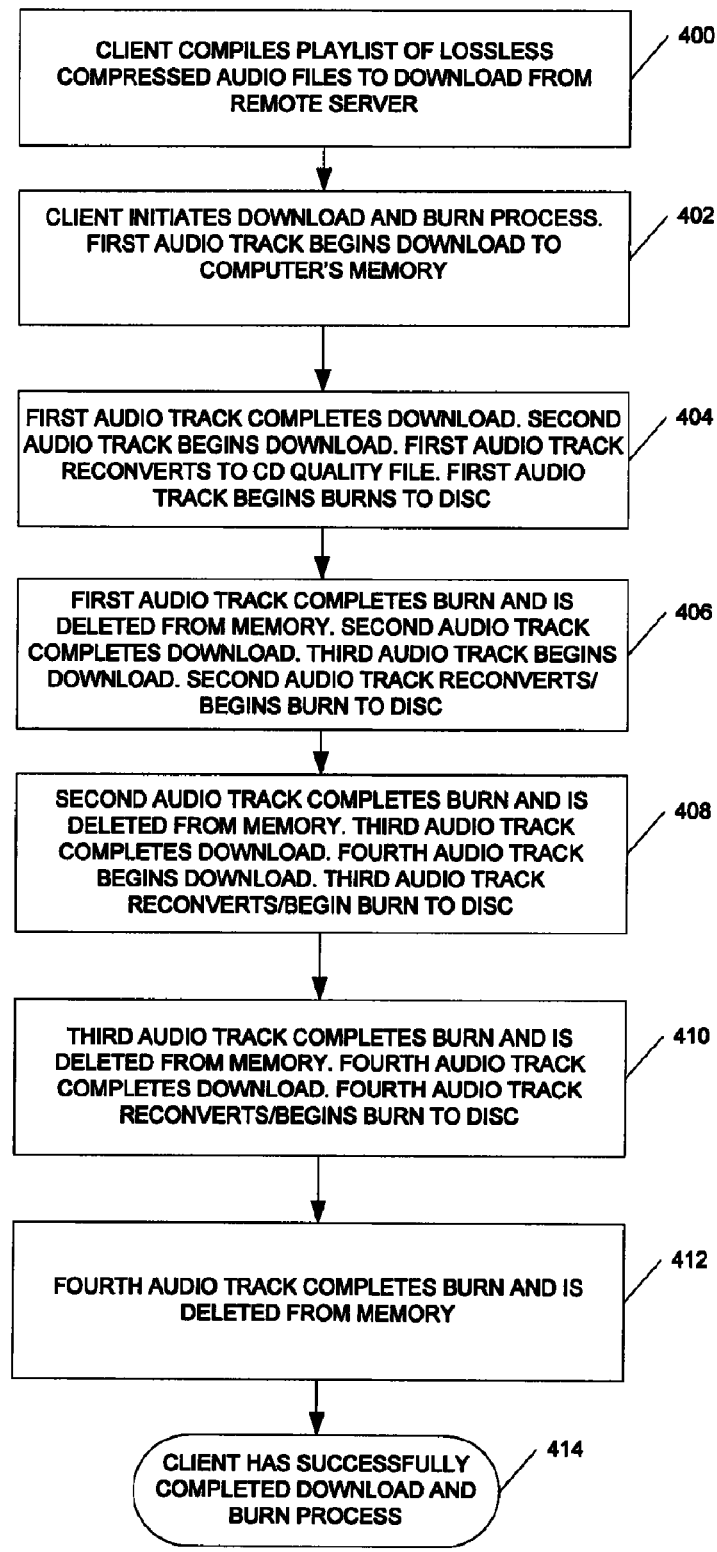
FIG. 4 illustrates processing logic for a simultaneous download and burn process for compressed audio files in an exemplary embodiment.

FIG. 4 illustrates exemplary processing logic for a simultaneous download and burn process for compressed audio files. This example assumes that a playlist of four audio tracks is to be downloaded from a remote server and burned to a CD. As indicated in logic block 400, the client computer compiles and transmits a playlist of compressed audio files to be downloaded from the remote server. The client computer initiates the download and burn process as indicated in logic block 402. The first audio track begins a download to the computer's memory. As the first audio track completes download, the second audio track begins to download. The first audio track is reconverted (i.e., decompressed) to a CD quality file and begins to burn to disc. These acts are illustrated in logic block 404.

The process continues as indicated in logic block 406. The first audio track has completed its burn to disc and is deleted from memory. The second audio track completes its download. The third audio track begins its download. The second audio track is reconverted and begins its burn to disc. As indicated in logic block 408, the second audio track completes its burn and is deleted from memory. The third audio track completes its download. The fourth audio track begins its download. The third audio track is reconverted and burned to disc. As indicated in logic block 410, once the third audio track completes its burn, it is deleted from memory. The fourth audio track completes its download, is reconverted and begins its burn to disc. As indicated in logic block 412, once the fourth audio track completes its burn, it is deleted from memory. The process terminates in logic block 414 with the successful download and burn of all audio tracks in the playlist.

Figure 5:
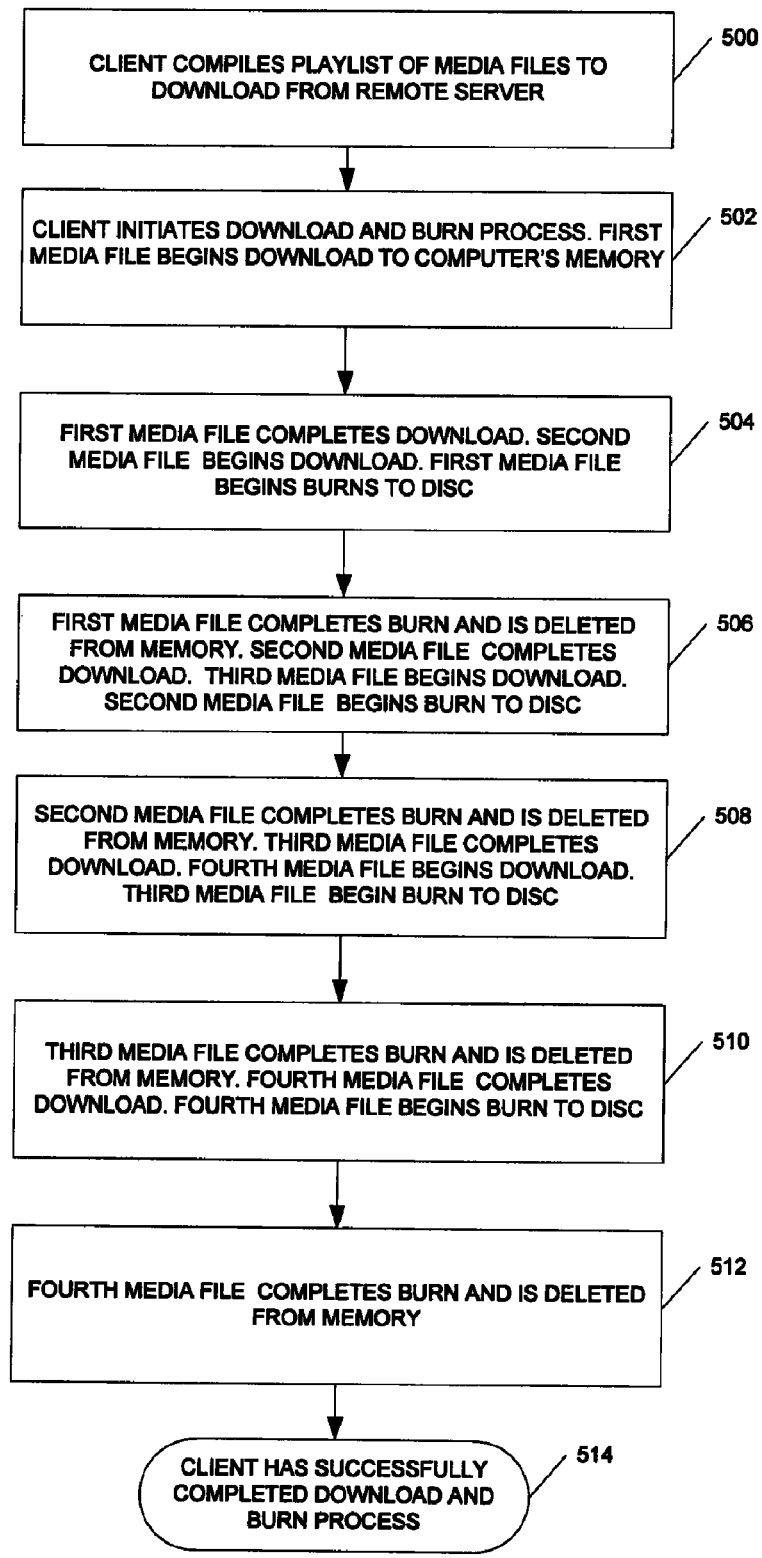
FIG. 5 illustrates processing logic for a simultaneous download and burn process for media files in an exemplary embodiment.

FIG. 5 illustrates processing logic for a simultaneous download and burn process for media files in an exemplary embodiment. This example is very similar to the preceding example for compressed audio files, with the exception of decompressing the downloaded media files. This example assumes that a playlist of four media files is to be downloaded from a remote server and burned to a CD or DVD. As indicated in logic block 500, the client computer compiles and transmits a playlist of audio files to be downloaded from the remote server. The client computer initiates the download and burn process as indicated in logic block 502. The first media file begins a download to the computer's memory. As the first media file completes download, the second media file begins to download. The first media file begins its burn to disc. These acts are illustrated in logic block 504.

The process continues as indicated in logic block 506. The first media file has completed its burn to disc and is deleted from memory. The second media file completes its download. The third media file begins its download. The second media file begins its burn to disc. As indicated in logic block 508, the second media file completes its burn and is deleted from memory. The third media file completes its download. The fourth media file begins its download. The third media file is burned to disc. As indicated in logic block 510, once the third media file completes its burn, it is deleted from memory. The fourth media file completes its download and begins its burn to disc. As indicated in logic block 512, once the fourth media file completes its burn, it is deleted from memory. The process terminates in logic block 514 with the successful download and burn of all media files in the playlist.

In the heuristic method of downloading and burning, instead of starting and stopping the CD burner as the downloaded tracks are completed, the client software determines when enough data for the complete playlist has been received to allow the continuous burning of all the tracks without pause. The significance of pausing the burn process is that some CD burners will insert a pause or in some cases an audible click or distortion between the tracks. It is sometimes desirable to burn a complete playlist, such as a whole album without pausing the burn to ensure that there are no gaps between songs. To do this successfully, the software must have enough data to keep the CD burner fed continuously without pause during the whole of the burning process. The software must determine when to start the burn process to ensure that the burner does not "starve" for data. This can be done by monitoring the download speed for several tracks to calculate the amount of time, on average it takes to download a block of data. In addition, the software must calculate the amount of time it will take to burn the whole playlist to the CD-R disc. The CD-R disc will burn at a constant rate that is set by the software before the burning process begins. This rate is specified as a multiplier of the base rate for an audio CD. This base rate is 153,600 bytes per second. Many CD-R burners will not allow a burn rate less than two times the base rate so the software will calculate the duration using a burn rate of at least 307,200 bytes per second. This burn rate multiplier can be tuned within the specifications for the client computer's CD-R burner to reach an optimal burn rate to match the download rate. Given the nature of online networks, the download rate may not be constant. It is also necessary for the software to add a safety factor to the estimated download time to ensure that a slowdown late in the download process does not starve the burner. This factor can be estimated by monitoring the variation in the download speed over several tracks of data.

Figure 6:
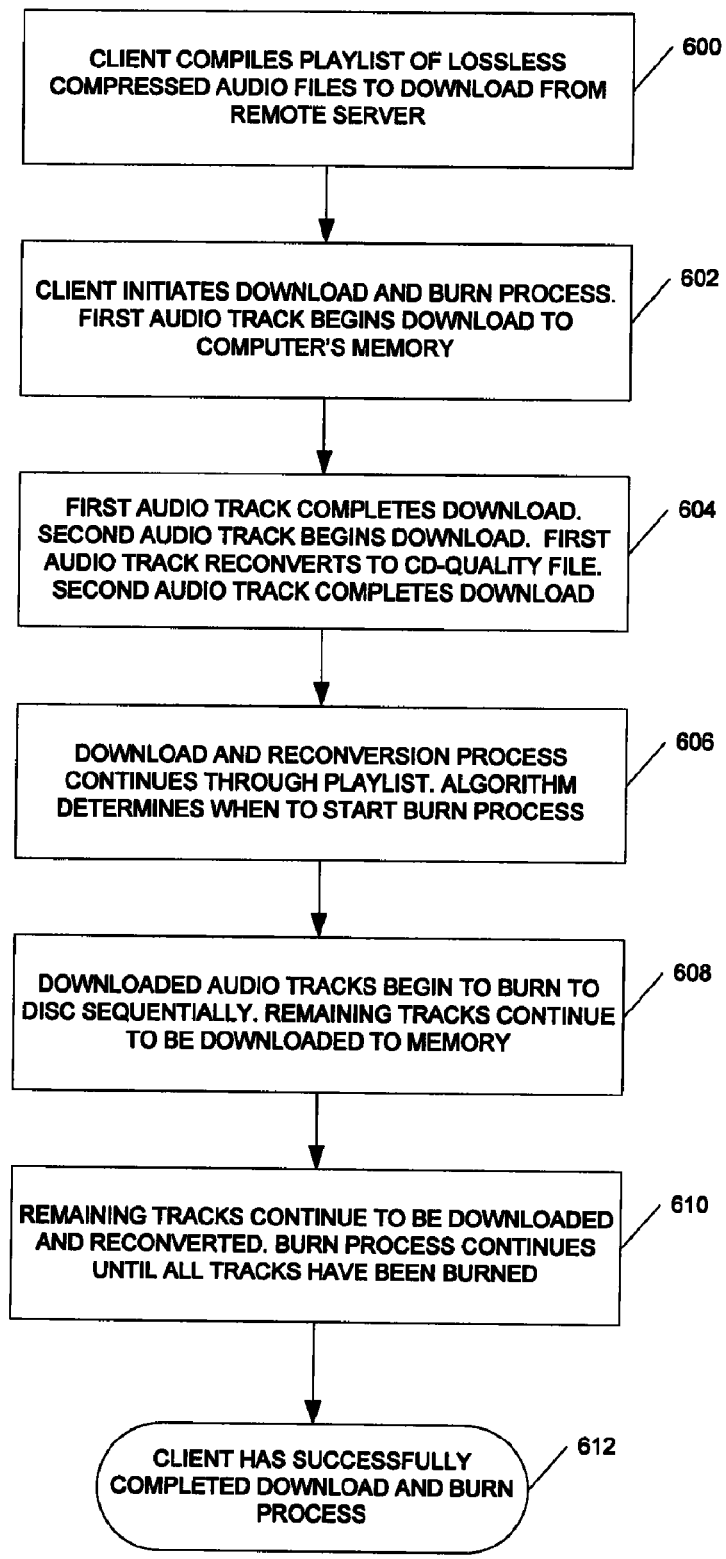
FIG. 6 illustrates processing logic for a heuristic download and burn process for compressed audio files in an exemplary embodiment.

FIG. 6 illustrates exemplary processing logic for a heuristic download and burn process for compressed audio files. As above, this example assumes that a playlist of four audio tracks is to be downloaded from a remote server and burned to a CD. As indicated in logic block 600, the client computer compiles and transmits a playlist of compressed audio files to be downloaded from the remote server. The client computer initiates the download and burn process as indicated in logic block 602. The first audio track begins a download to the computer's memory. As the first audio track completes download, the second audio track begins to download. The first audio track is reconverted (i.e., decompressed) to a CD quality file. The second audio track completes its download. These acts are illustrated in logic block 604.

As indicated in logic block 606, the download and reconversion process continues through the playlist. A "heuristic" algorithm determines when to start the burn process based on estimated download and burn times. The downloaded tracks begin to burn to disc sequentially while the remaining tracks continue to be downloaded to memory as indicated in logic block 608. The remaining tracks continue to be downloaded and reconverted while the burn process continues as indicated in logic block 610. Once all tracks have been downloaded, reconverted and burned to disc, the process terminates as indicated in logic block 612.

Figure 7:
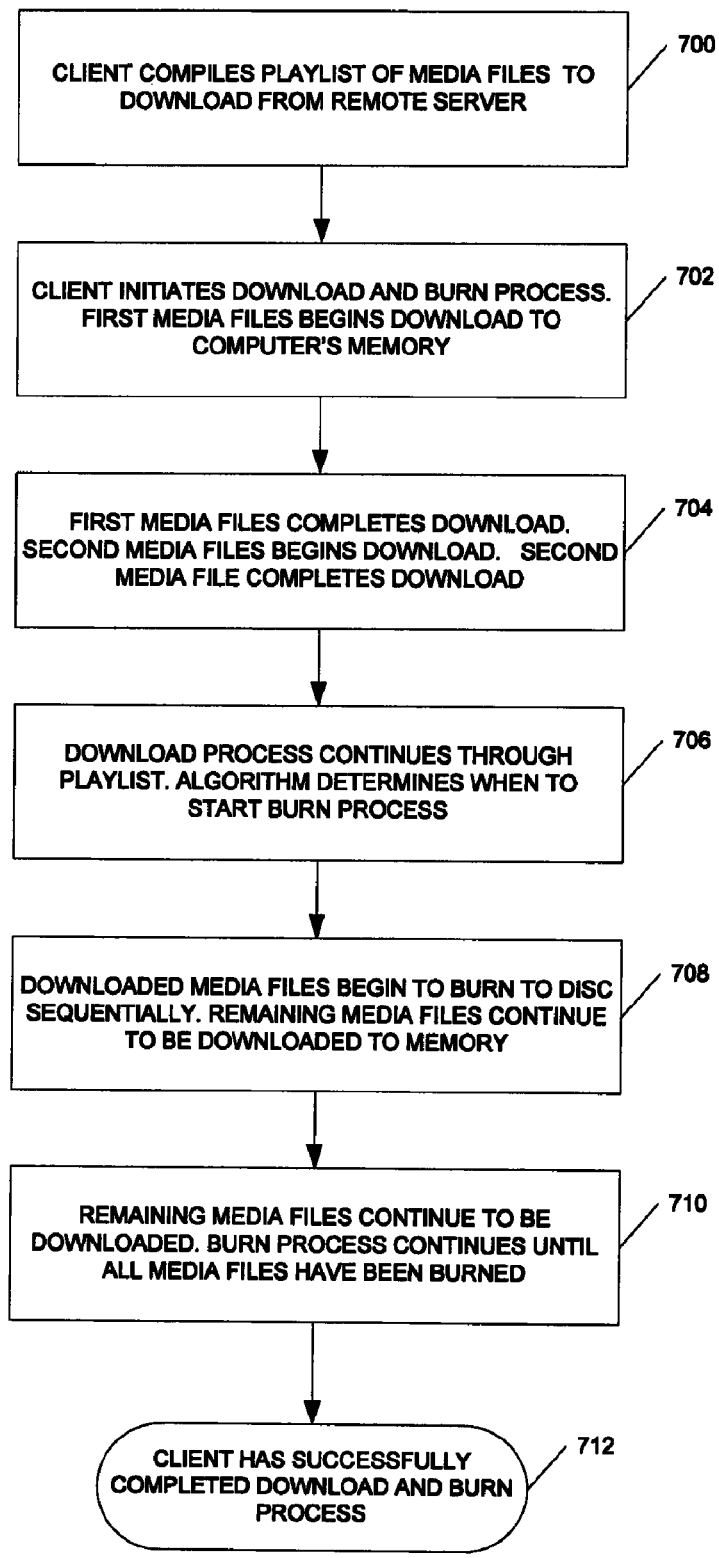
FIG. 7 illustrates processing logic for a heuristic download and burn process for media files in an exemplary embodiment.

FIG. 7 illustrates exemplary processing logic for a heuristic download and burn process for media files. This example is very similar to the preceding example for compressed audio files, with the exception of decompressing the downloaded media files. This example assumes that a playlist of four media files is to be downloaded from a remote server and burned to a CD or DVD. As indicated in logic block 700, the client computer compiles and transmits a playlist of media files to be downloaded from the remote server. The client computer initiates the download and burn process as indicated in logic block 702. The first media file begins a download to the computer's memory. As the first media file completes download, the second media file begins to download. The second media file then completes its download. These acts are illustrated in logic block 704.

As indicated in logic block 706, the download process continues through the playlist. A "heuristic" algorithm determines when to start the burn process based on estimated download and burn times. The downloaded tracks begin to burn to disc sequentially while the remaining tracks continue to be downloaded to memory as indicated in logic block 708. The remaining tracks continue to be downloaded while the burn process continues as indicated in logic block 710. Once all tracks have been downloaded and burned to disc, the process terminates as indicated in logic block 712.

The significance of burning audio tracks to CD-R simultaneously as they are downloaded is to prevent the need for a large amount of temporary or hard disk space on the client computer and also to ensure that the tracks are not retained on the client computer any longer than necessary to burn to CD-R. Without the use of this method, the client computer would require a significant amount of disk space, sometimes up to 800 MB or 1 GB for an audio CD. The CD is burned as an Audio CD, also known as Redbook audio. This is the music format of a traditional music CD, not a data CD.

The client software has a user interface (UI) that is customized for each platform. In exemplary embodiments, the UI can be Windows and Mac OS X or use an application hosted on a world wide web server. The UI is responsible for allowing the user to select tracks from a list of music available for purchase, organizing the list into a desired track order when appropriate, initiating the purchase/download and burning the resulting CD as a Redbook audio CD. A comprehensive library of CD burners is built into the software in order to enable clients to burn files to CD-R or CD-RW with virtually any commercially available CD burner hardware.

The invention may be used in combination with a number of universal software processes such as CD ripping or digital format conversion, which do not alter the invention's basic functionality, architecture, process or method.

The invention may be used for the digital delivery of any type of digital file from a network directly to optical disc. These files include but are not limited to DVD media, High-Definition DVD media, Surround Sound 5.1, FLAC, OGG, h.264, AIFF, Sound Design II (SDII), Sony Adaptive Transform Acoustic Coupling (ATRAC), Microsoft Windows Media Audio (WMA), Waveform Audio Format (WAV), RAM, MP3, MP4, Adaptive Transform Acoustic Coupling (AAC), Quicktime, Apple Lossless, Super Audio CD (SACD), MPEG and Audio Video Interleave (AVI).

For digital video distribution, the inventive process is identical to the audio process, however the files are not compressed with a lossless compression scheme. Lossless compression is not desirable for video content. Video content is very large in comparison to audio content and the fidelity issue is not the same as with audio. Audio is delivered in high-quality stereo at nearly the limits of human perception. Thus, any type of compression is noticeable. Video is not equivalent. The current US non-digital standard is fairly low visual fidelity, so even DVD video compression is largely unnoticeable by users.

In the case of digital video distribution, large, complete video files are broken into smaller video files. Upon initiation by the client 20, the server 10 pushes one file at a time to the client computer's memory 25. Once a file resides in the client computer's memory 25, the file burns to DVD-R or DVD-RW on the client's DVD burner 30 and the server initiates delivery of the next video file to virtual memory. The process repeats until all video content files have been compiled on disc. The "tracks" or file sections are assembled on disc according to the blueprint of the original video file using an incremental writing process. A comprehensive library of DVD burners is built into the software in order to enable clients to burn files to DVD-R or DVD-RW with virtually any commercially available DVD burner hardware. Digital video distribution can also be achieved through the heuristic method as previously described.

The digital distribution of other types of media files including video games proceeds using the inventive method in the same manner as video file distribution or alternatively, through the heuristic method as previously described.

The content is hosted on remote server(s) in an exemplary embodiment, and likewise, the content is provided from those servers. However, it is always possible to change the protocol for different hosting protocols. The software is modular and thus a new protocol can be added with little change to the software with no change to the inventive method.

It is also possible to perform a digital content provider's protocol on the remote server(s) and to use the client software as is. Rather than updating the client software, the hosting software on the remote server(s) would be changed instead.

The system and method of the present invention have been described as computer-implemented processes. It is important to note, however, that those skilled in the art will appreciate that the mechanisms of the present invention are capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiment are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed:

1. A method for downloading a plurality of digital files over a computer network and writing the digital files to a removable storage media comprising the steps of:
   compiling a list of digital files to download and transmitting the list to a plurality of servers hosting the digital files in a digital content database;
   simultaneously downloading the digital files in the list from the plurality of servers to a memory on a client personal computer;
   determining when the downloaded digital files should begin a continuous writing to the removable storage media, based at least in part on a data download speed for the client personal computer, a write speed for writing the downloaded digital files to the removable storage device, and an amount of data being written to the removable storage media, to prevent distortion between the digital files;
   writing each downloaded digital file from memory to the removable storage media continuously while concurrently downloading additional digital files in the list from the plurality of servers; and
   erasing each digital file from memory immediately after being written to the removable storage media.

2. The method for downloading and writing digital files of claim 1 wherein the plurality of digital files are lossless compressed audio files.

3. The method for downloading and writing digital files of claim 1 wherein the plurality of digital files are uncompressed video files.

4. The method for downloading and writing digital files of claim 2 further comprising the step of converting each downloaded file to an uncompressed format before writing the digital file to the removable storage media.

5. The method for downloading and writing digital files of claim 1 further comprising the step of compressing each digital file using a lossless audio compression codec.

6. The method for downloading and writing digital files of claim 1 further comprising the step of segmenting each digital file and transmitting each segment to the client personal computer.

7. The method for downloading and writing digital files of claim 6 further comprising assembling each segment received by the client personal computer into an original sequence.

8. The method for downloading and writing digital files of claim 1 wherein the digital content stored at each server is at least one of an audio file, a video file and a video game file.

9. The method for downloading and writing digital files of claim 1 wherein the step of determining when the downloaded digital files should begin a continuous writing to the removable storage media includes estimating a download time and a write time for each digital file in the list.

10. A computer program product for downloading a plurality of digital files over a computer network and writing the digital files to a removable storage media, comprising a non-transitory computer readable medium having computer readable code embedded therein, the computer readable medium comprising:
    program instructions that compile a list of digital files to download and transmit the list to a plurality of servers hosting the digital files in a digital content database;

program instructions that simultaneously download the digital files in the list from the plurality of servers to a memory on a client personal computer;

program instructions that determine when the downloaded digital files should begin a continuous writing to the removable storage media, based at least in part on a data download speed for the client personal computer, a write speed for writing the downloaded digital files to the removable storage device, and an amount of data being written to the removable storage media, to prevent distortion between the digital files;

program instructions that write each downloaded digital file from memory to the removable storage media continuously while concurrently downloading additional digital files in the list from the plurality of servers; and program instructions that erase each digital file from memory immediately after being written to the removable storage media.

11. The computer program product for downloading a plurality of digital files of claim 10 wherein the plurality of digital files are lossless compressed audio files.

12. The computer program product for downloading a plurality of digital files of claim 10 wherein the plurality of digital files are uncompressed video files.

13. The computer program product for downloading a plurality of digital files of claim 11 further comprising program instructions that convert each downloaded file to an uncompressed format before writing the digital file to the removable storage media.

14. The computer program product for downloading a plurality of digital files of claim 10 further comprising program instructions that compress each digital file using a lossless audio compression.

15. The computer program product for downloading a plurality of digital files of claim 10 further comprising program instructions that segment each digital file and transmit each segment to the client personal computer.

16. The computer program product for downloading a plurality of digital files of claim 15 further comprising program instructions that assemble each segment received by the client personal computer into an original sequence.

17. The computer program product for downloading a plurality of digital files of claim 10 wherein the program instructions that determine when the downloaded digital files should begin a continuous writing to the removable storage media include program instructions that estimate a download time and a write time for each digital file in the list.

18. A system for downloading a plurality of digital files over a computer network and writing the digital files to a removable storage media comprising:

a processor and a memory;

a component that compiles a list of digital files to download and transmits the list to a plurality of servers hosting the digital files in a digital content database;

a component that simultaneously downloads the digital files in the list from the plurality of servers to a memory on a client personal computer;

a component that determines when the downloaded digital files should begin a continuous writing to the removable storage media, based at least in part on a data download speed for the client personal computer, a write speed for writing the downloaded digital files to the removable storage device, and an amount of data being written to the removable storage media, to prevent distortion between the digital files;

a component that writes each downloaded digital file from memory to the removable storage media continuously while concurrently downloading additional digital files in the list from the plurality of servers; and a component that erases each digital file from memory immediately after being written to the removable storage media.

19. The system for downloading and writing digital files of claim 18 wherein the downloaded digital files are audio files in a lossless compressed format and further comprising a component that converts each downloaded file to an uncompressed format before writing the digital file to the removable storage media.

20. The system for downloading and writing digital files of claim 18 further comprising a lossless audio compression codec for compressing each digital file before downloading the file to the client personal computer.

21. The system for downloading and writing digital files of claim 18 further comprising a component that segments each digital file and transmits each segment to the client personal computer.

22. The system for downloading and writing digital files of claim 18 further comprising a component that assembles each segment received by the client personal computer into an original sequence.

23. The system for downloading and writing digital files of claim 18 wherein the component that determines when the downloaded digital files should begin a continuous writing to the removable storage media includes a module for estimating a download time and a write time for each digital file in the list.

* * * * *